United States Patent
Licata et al.

(10) Patent No.: US 9,245,051 B2
(45) Date of Patent: Jan. 26, 2016

(54) METHOD AND APPARATUS FOR CONDUCTING A SEARCH BASED ON AVAILABLE DATA MODES

(75) Inventors: Aaron Licata, Pleasanton, CA (US); Adetokunbo Bamidele, Dublin, CA (US); Mark Travis Fulks, Danville, CA (US)

(73) Assignee: NOKIA TECHNOLOGIES OY, Espoo (FI)

( * ) Notice: Subject to any disclaimer, the term of this patent is extended or adjusted under 35 U.S.C. 154(b) by 528 days.

(21) Appl. No.: 13/237,175

(22) Filed: Sep. 20, 2011

(65) Prior Publication Data

US 2013/0073583 A1 Mar. 21, 2013

(51) Int. Cl.
G06F 17/30 (2006.01)
G06K 9/62 (2006.01)
G06K 9/00 (2006.01)
G06K 9/32 (2006.01)

(52) U.S. Cl.
CPC .... *G06F 17/30967* (2013.01); *G06F 17/30253* (2013.01); *G06F 17/30864* (2013.01); *G06K 9/00463* (2013.01); *G06K 9/3266* (2013.01); *G06K 9/6263* (2013.01)

(58) Field of Classification Search
CPC ............... G06F 17/30967; G06F 17/30864; G06F 17/30253; G06F 17/30256; G06K 9/00463
See application file for complete search history.

(56) References Cited

U.S. PATENT DOCUMENTS

| | | | |
|---|---|---|---|
| 5,410,611 A * | 4/1995 | Huttenlocher et al. | 382/177 |
| 6,728,752 B1 | 4/2004 | Chen et al. | |
| 7,739,221 B2 * | 6/2010 | Lawler et al. | 707/770 |
| 2007/0002375 A1 * | 1/2007 | Ng | 358/1.18 |
| 2009/0150791 A1 | 6/2009 | Garcia | |
| 2011/0090253 A1 * | 4/2011 | Good | 345/633 |
| 2011/0123115 A1 * | 5/2011 | Lee et al. | 382/185 |
| 2011/0128288 A1 * | 6/2011 | Petrou et al. | 345/428 |
| 2011/0131241 A1 * | 6/2011 | Petrou et al. | 707/770 |
| 2011/0143811 A1 * | 6/2011 | Rodriguez | 455/556.1 |
| 2012/0087537 A1 * | 4/2012 | Liu et al. | 382/100 |
| 2012/0092329 A1 * | 4/2012 | Koo et al. | 345/419 |

FOREIGN PATENT DOCUMENTS

WO 2008002638 A1 1/2008

OTHER PUBLICATIONS

Haralick et al., Document Page Decomposition by the Bounding-Box Projection Technique, 1995, IEEE, pp. 1119-1122.*
European Office Action for related European Application No. 12832837.4-1507 dated Mar. 27, 2015, 7 pages.

* cited by examiner

*Primary Examiner* — Leslie Wong
(74) *Attorney, Agent, or Firm* — Ditthavong & Steiner, P.C.

(57) ABSTRACT

An approach is provided for conducting a search based on an extraction of a search term from available sensor data. The approach involves determining sensor data associated with at least one device, the sensor data determined from among a plurality of available data modes. The approach also involved processing and/or facilitating a processing of the sensor data to cause, at least in part, an extraction of one or more search terms for at least one query. The approach further involves determining one or more results of the at least one query based, at least in part, on context information associated with the at least one device, user profile information associated with the at least one device, or a combination thereof.

19 Claims, 10 Drawing Sheets

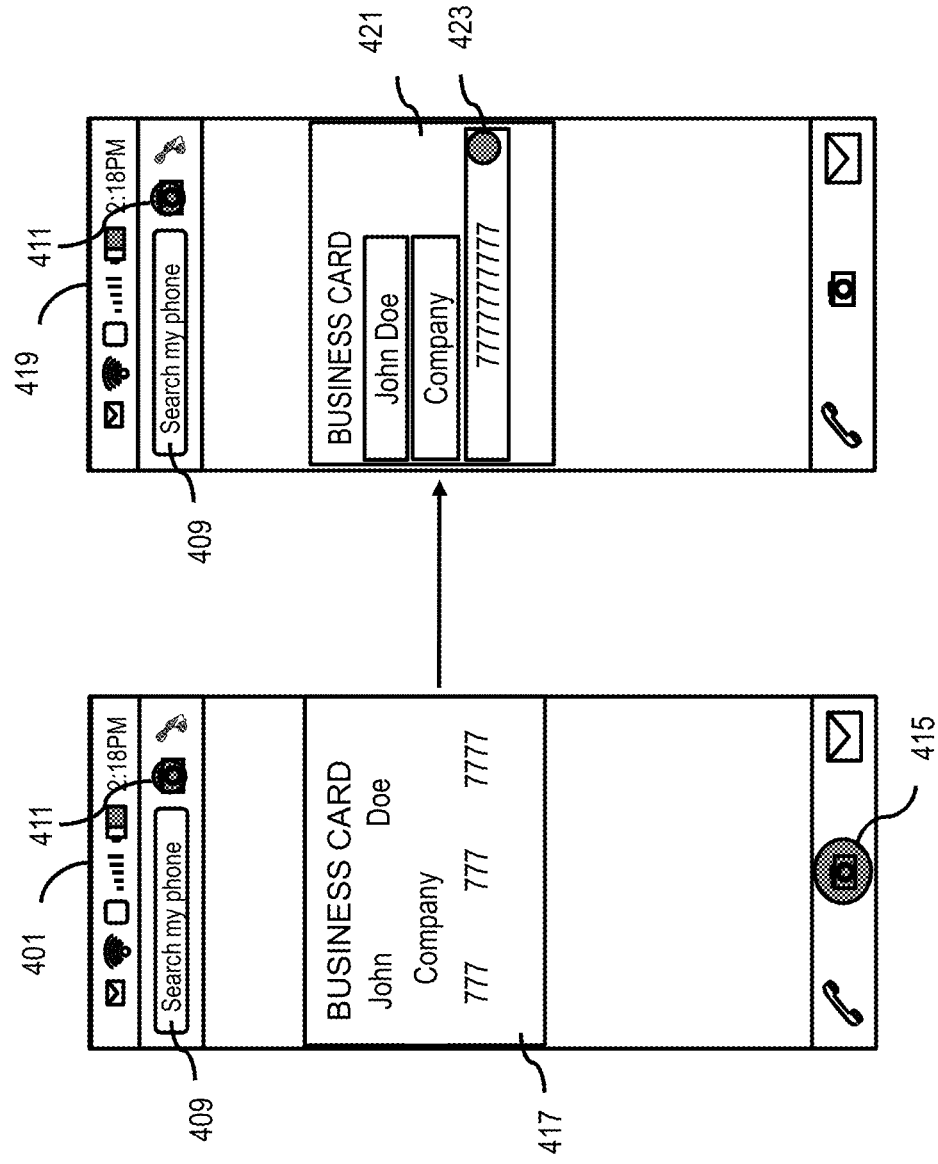

METHOD AND APPARATUS FOR CONDUCTING A SEARCH BASED ON AVAILABLE DATA MODES

BACKGROUND

Service providers and device manufacturers (e.g., wireless, cellular, etc.) are continually challenged to deliver value and convenience to consumers by, for example, providing compelling network services. Mobile visual search is a new paradigm in the field of pattern recognition; it builds on the premise and research of information retrieval and visual informatics. Over a decade of textual-based search on a desktop and wired-internet search has shown a gradual evolution into a more ubiquitous and pervasive means of accessing information with less constraints. With the advent increase in the use of mobile devices and convergence of services of telecommunication, advances in sensor hardware, and embedded software platforms, a mobile device is fast becoming main choice of pervasive mobile technology.

SOME EXAMPLE EMBODIMENTS

Therefore, there is a need for an approach for conducting a search based on an extraction of a search term from available sensor data.

According to one embodiment, a method comprises determining sensor data associated with at least one device, the sensor data determined from among a plurality of available data modes. The method also comprises processing and/or facilitating a processing of the sensor data to cause, at least in part, an extraction of one or more search terms for at least one query. The method further comprises determining one or more results of the at least one query based, at least in part, on context information associated with the at least one device, user profile information associated with the at least one device, or a combination thereof.

According to another embodiment, an apparatus comprises at least one processor, and at least one memory including computer program code for one or more computer programs, the at least one memory and the computer program code configured to, with the at least one processor, cause, at least in part, the apparatus to determine sensor data associated with at least one device, the sensor data determined from among a plurality of available data modes. The apparatus is also caused to process and/or facilitate a processing of the sensor data to cause, at least in part, an extraction of one or more search terms for at least one query. The apparatus is further caused to determine one or more results of the at least one query based, at least in part, on context information associated with the at least one device, user profile information associated with the at least one device, or a combination thereof.

According to another embodiment, a computer-readable storage medium carries one or more sequences of one or more instructions which, when executed by one or more processors, cause, at least in part, an apparatus to determine sensor data associated with at least one device, the sensor data determined from among a plurality of available data modes. The apparatus is also caused to process and/or facilitate a processing of the sensor data to cause, at least in part, an extraction of one or more search terms for at least one query. The apparatus is further caused to determine one or more results of the at least one query based, at least in part, on context information associated with the at least one device, user profile information associated with the at least one device, or a combination thereof.

According to another embodiment, an apparatus comprises means for determining sensor data associated with at least one device, the sensor data determined from among a plurality of available data modes. The apparatus also comprises means for processing and/or facilitating a processing of the sensor data to cause, at least in part, an extraction of one or more search terms for at least one query. The apparatus further comprises means for determining one or more results of the at least one query based, at least in part, on context information associated with the at least one device, user profile information associated with the at least one device, or a combination thereof.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention.

Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 4B illustrates user interfaces utilized in the processes of FIG. 3, according to various embodiments;

DESCRIPTION OF SOME EMBODIMENTS

Examples of a method, apparatus, and computer program for conducting a search based on an extraction of a search term from available sensor data are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term context refers to, at least in part, all contextual data, user data and user-to-device interaction data (e.g., date, time of day, location, activity, motion, position, modality, spatiotemporal element, etc.) as collected, and is particularly useful for determining a present state or modality of the device. In addition, context information can be determined through analysis of historical data pertaining to the user or device, so as to enable a means of predicting to a degree to certainty expected or future device states or modalities. For example, if it is observed that a user frequently visits a particular restaurant during the early morning hours of the day, this information can be utilized for determining or defining a context relative to the user based on this tendency (e.g., 8 am, eat at the diner). Hence, the compilation of context information can be analyzed appropriately, including referenced with respect to additional data and/or a context model, for enabling the context of a device, device user or one or more other associated users and their respective devices to be determined accordingly.

Figure 1:
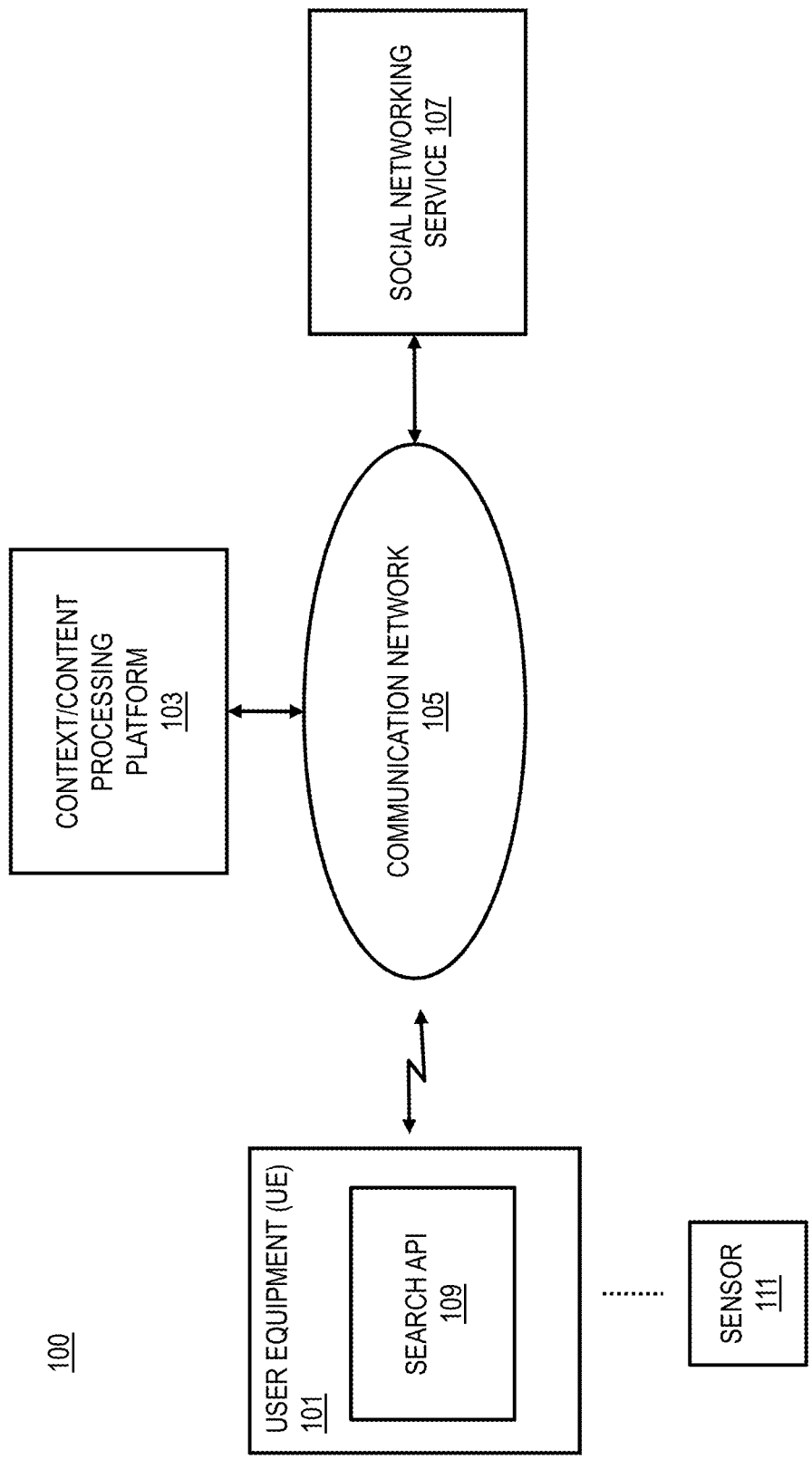
FIG. 1 is a diagram of a system capable of conducting a search based on an extraction of a search term from available sensor data, according to one embodiment.

FIG. 1 is a diagram of a system capable of conducting a search based on an extraction of a search term from available sensor data, according to one embodiment. OCR is the mechanical or electronic translation of scanned image of handwritten, typewritten or printed text into machine-encoded text. OCR is a fairly new development for use in mobile devices. Mobile visual search is also a new paradigm in the field of pattern recognition; it builds on the premise and research of information retrieval and visual informatics. Over a decade of textual-based search on a desktop and wired-internet search has shown a gradual evolution into a more ubiquitous and pervasive means of accessing information with less constraints. With the advent increase in the use of mobile devices and convergence of services of telecommunication, advances in sensor hardware, and embedded software platforms, a mobile device is fast becoming main choice of pervasive mobile technology.

The advances in functionality mobile devices equipped with a camera sensor, operating system, graphical processing unit and network connectivity opens the development of advanced location based services that allow a user to analyze visual content and inferred abstraction within an augmented browser for online mobile search from different categories of content types using combinations of contextual data mainly point of interest locations ("POI") and global positioning system ("GPS") generated location information. However, the recognition of different categories of content namely bar-codes, OCR, 2D planar object and speech-to-text cannot be achieved in real-time in one unified framework in real-time.

Issues also exist with most conventional text region detection algorithms that detect characters and use bounding boxes to identify the location in an image. Generally most algorithms detect these regions as an OCR pre-processing stage for improved and efficient detection. However, the bounding boxes (BBX) are not practical because of the fragmented nature of the locations for the OCR recognition module. BBX depict regions where possible text regions exist, and input the coordinates (x, y, width, height) of the region to the OCR for recognition.

For business cards, pre-processing just text regions is insufficient because a phone number may have three blocks of BBX which will result in separate recognition of each region. One solution is to concatenate the output recognized strings into a sentence. However, this results frequently in erroneous results.

There is a need for the ability to take a picture, or sense sound for example, of multiple content types and perform an online textual search with minimal textual entry. Users want to be able to search for information without having to describe the desired information using high level abstractive textual string of visual information.

To address these problems and satisfy at least the above-mentioned need, a system 100 of FIG. 1 introduces the capability to enhance the application of OCR within the realm of mobile devices.

The system 100 allows a user to use a mobile device's sensors such as, but not limited to, GPS, optical, and/or audio sensors to efficiently access information based on audio, visual or contextual location cues through a web search from within an augmented reality browser in real-time.

As shown in FIG. 1, the system 100 comprises a user equipment (UE) 101 having connectivity to a context/content processing platform, and a social networking service 107 via a communication network 105. The system 100 also comprises search API 109 that may be accessible by way of UE 101, or any other means by way of the communication network 105.

In one or more embodiments, the system 100 determines data upon which a search is to be based by converting user speech-to-text, converting an object detected in a visual scene to a searchable item, detecting text in a visual scene (OCR), decoding barcodes in real-time, etc. This framework allows multi-modal entry points of sensor data via one or more sensors 111 associated with UE 101 and a pattern recognition engine associated with a user profile of a user associated with at least one of the UE 101 and the social networking service 107. The sensor data may be converted to allow for a web search to determine information extracted from the search API 109 which may be an augmented reality browser. Depending on a determined geo-location of the UE 101 sensed by the one or more sensors 111, the resulting text can be translated to an appropriate language on a display of the augmented reality browser for the web search.

Any search and/or production of results of the search using search API 109 is based on an interaction, an extraction and an abstraction of information from a visual scene within an augmented reality browser functionality of the search API 109 that operationally resides in a core variety of pattern recognition processing units leveraging the sensors 111 of the UE 101 which may be, for example, GPS, camera and audio sensors to assist in further defining high abstraction search results. The search API 109 may receive a user input such as a textual input and/or sensor data in the form of a JPG image (visual), a video, user points-of-interest (user geo-location POI), GPS data and user speech (audio), for example that has been captured by the sensors 111. The sensor data may contain recognized or transcribed text to be translated to an appropriate language, or to be input as subject of a search.

The search API 109 may, for example, support image related inputs such as multiple line text detection, barcode detection and object detection so that book covers, CD covers, business cards, 2d planar marketing collateral and speech in their entirety can be recognized, transcribed, translated, displayed to the user, become selectable, and are available as an input for a web search engine by way of the search API 109.

In one or more embodiments, interaction, extraction and abstraction from a visual scene uses sensors 111 to assist in the automatic labeling (high level text labels) of pattern recognition (e.g., bag of words indexing from photo search systems or text labels extracted from OCR). This aims to use visual and voice search in conjunction with an augmented reality browser with aided by sensors 111 to determine location, for example. The system 100 may also use data available by way of user profiling and user speech to enhance any extraction of data from a visual scene or audio input, as well as enhance any search results. For example a user may do a speech to text search based on audio input detected by sensor 111, the result is a search of "keyword—'Black Swan.'" System can recommend additional information beyond a simple one-to-one matching of search results to the given keyword based a user behavior profile available from the social networking service 107, or the UE 101, for example, combined with location and contextual information determined by way of sensor 111.

For example, if the determined location is Leceister square, a movie showing "Black Swan" at Leceister Square Cinema at times relating to a determined time of the search, or a time at which the user is estimated to be in the area or available to see a movie based on the user behavior profile may be presented. The user behavior profile may be used to extend suggestions to restaurants in the area (Italian, Jamaican, Mexican, for example based on the user's interests) and taxi (transportation) telephone numbers, location, or any other behavioral suggest that may be relevant to the location of the UE 101, an estimated location at a particular time based on the user profile, or specifically related to the search such that the output is independent of the sensor data determined by sensors 111. This allows the user to universally search the visual scene, detected audio or geographical location for relevant information pertaining to any sensor data that relates to the user's behavior profile available by way of social networking service 107. By integrating the capabilities of the search API 109 with the social networking service 107, POI locations can be updated based on user annotated data, Advertising collateral can be recommended based on POI, text search and user category profiling can be performed, and a contacts directory associated with the social networking service 107 can be updated to share automated annotated data.

Using the sensors 111 as a means for data collection and search input alleviates and automates the user entry of visual, audio and contextual cues (location and user behavior) for real-time information retrieval within an augmented browser of the physical environment.

In or more embodiments, the context/content processing platform 103 pre-processes any possible textual inputs sensed by sensor 111 to assist in further defining OCR results. For instance, in a case where OCR is conducted on a business card where multiple BBX may be generated around possible text regions where a telephone number is located resulting in multiple BBX that when search individually are virtually meaningless with respect to the intended search (i.e. for the whole telephone number), the pre-processing module receives an input from a text region detector and groups the BBX according to text lines to form a concatenated bounding box.

The context/content processing platform 103 in its pre-processing function supports multiple line text detection so that book covers, CD covers and business cards in their entirety can be recognized, displayed to the user, become selectable, and are available as input to a web search engine. This method allows bounding boxes from the text region detection algorithm to be grouped and merged prior to OCR processing by the context/content processing platform 103.

In one or more embodiments, the context/content processing platform 103 merges and groups any detected bounding boxes on a same text line to form a whole bounding box or a sentence from a group of bounding boxes prior to OCR processing. For example, a bounding box may be input from a text region detection algorithm in the format (bx)=[x, y, width, height]. The bounding box may be, for example, a rectangle box with length in two directions namely x & y and a corresponding width and height. It should be noted, however, that the bounding box may be any shape that could encompass text, be it a square, triangle, circle, ellipse, or any polygon, or curved structure that encompasses any combination of arcs with straight or curved lines, for example. The context/content processing platform 103 counts the number of BBX. The context/content processing platform 103 may expand each of the BBX in four directions [a,b,c,d]. The context/content processing platform 103 may also detect text lines for each bounding box. In the pre-processing steps, the context/content processing platform 103 assigns text line numbers to id each of the BBX. The context/content processing platform 103 also groups the BBX according to text lines in an array, geometrically merges, and joins each of the BBX by text line number id. The content/content processing platform 103 then re-ranks the grouped BBX from a top of the image to a bottom and outputs four new co-ordinate systems and a new number of BBX.

In one or more embodiments, the system 100 allows a user to extract information from an image and conduct an online search with minimal or no text entry by analyzing barcodes (1D & 2D), 2D planar objects, as well as by way of textual entry such as by OCR or other input as discussed above. The image, in this example, is input by sensor 111 which may be a camera. The input image is sent to the context/content processing platform 103 where detection is initiated to identify which types of content, i.e. barcode, text, 2D planar object, are present in the image. The content is analyzed and/or pre-processed and contextual information of the content in form of a textual string is output by the context/content processing platform 103.

For example, the barcode (1D & 2D), text and 2D planar detection analysis of an image input by way of the sensor 111 is done in real-time with respect to what is displayed by the device, for example in an augmented reality view of the search API 109. The context/content processing platform 103 may have multiple processing regions or engines where the recognition of relevant content is conducted.

For example, the resulting textual string produced as a result of any processing done by the context/content processing platform 103 can be a product of the text recognition, 2D planar object recognition or barcode recognition engines. This information can be used to search for relevant information online by way of the search API 109 or to search a database for matching decoded barcode numerical strings. In this context the user is automatically assisted in conducting a text based search based on the extraction of surrounding visual information.

Most conventional text/image processing systems are stand alone systems that focus on either only decoding of barcodes for localized database search or recognition of objects. These systems do not aim to combine the expert systems in a unified way for online textual search. The context/content processing platform, however, determines an appropriate processing engine for processing image data input by way of the sensor 111 because it distinguishes various data types and recognizes that a processing engine configured to process text operates differently from a processing engine configured to process a barcode image.

For example, text recognition comprises of pre-processing detection and OCR recognition. Text region localization and detection with multiple text region detection allow a user to select relevant text region on the display of the viewfinder at real time. Barcode recognition distinguishes between 1D and 2D barcodes through detection and decoding of the barcode to a textual numeric string. 2D planar recognition detects objects in a visual scene such as that displayed in an augmented reality view of search API 109, matches low level features to text labels (i.e., high level abstraction of a visual object). Each of the types of text/image processing examples discussed above could have its own or shared respective processing engine or system that specializes in a particular or shared type of processing.

Each processing engine or system returns a textual string that can be used to search for relevant information using search API 109. A user can get instant information using a unified framework with multiple content types and multiple expert recognition engines to decode and recommend keyword terms ready for input into the search API 109. The context/content processing platform 103 handles each detector phase and communication between each relevant expert system or processing engine.

When determining an appropriate processing engine, the context/content processing platform 103 communicates with confidence=1 for an object category detection and progress tracker=1. For example, if a content type is known, the confidence value is 1, and if it is unknown it is 0. With regard to the progress tracker, if progress of a processing is complete, the value is 1, and if not or timed out, the value is 0. If the context/content processing platform 103 yields a confidence value=1 and a recognition of the content is false, an image processing request may timeout and "cancel event may be required" (progress tracker=0). If the sensor 111 inputs an unknown object type for the context/content processing platform 103 to evaluate, the image request is "cancelled" (i.e., confidence=0, progress tracker=0). This cancellation propagates back to the context/content processing platform 103 and the client. In this instance no image processing request is fulfilled and a result set is "Null."

By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the UE 101, context/content processing platform 103, and social networking service 107 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
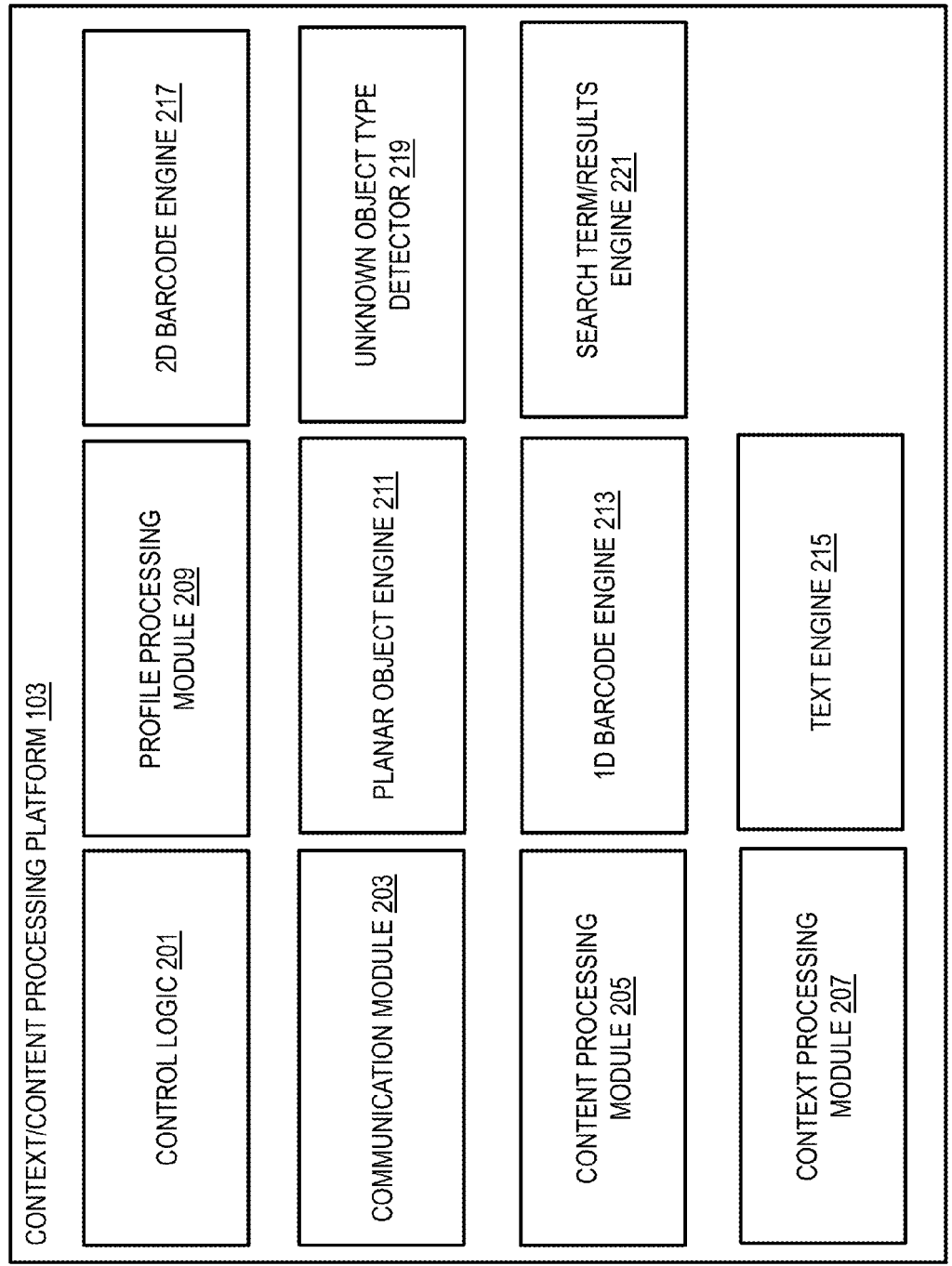
FIG. 2 is a diagram of the components of a context/content processing platform, according to one embodiment.

FIG. 2 is a diagram of the components of context/content processing platform 103, according to one embodiment. By way of example, the context/content processing platform 103 includes one or more components for providing conducting a search based on an extraction of a search term from available sensor data. It is contemplated that the functions of these components may be combined in one or more components or performed by other components of equivalent functionality. In this embodiment, the context/content processing platform 103 includes a control logic 201, a communication module 203, a content processing module 205, a context processing module 207, a profile processing module 209, a planar object engine 211, a 1D barcode engine 213, a text engine 215, a 2D barcode engine 217, an unknown object type detector 219, and a search term/suggestion engine 221.

The control logic 201 communicates with the search API 109 by way of the communication module 203. For example, if a user actuates a search using the search API by indicating a desire to search for content found in an image input by way of the sensors 111, or and audio input by way of the sensors 111, the control logic 201, in response to a request communicated to the context/content processing platform 103 by way of the communication module 203, instructs the content processing module 205 to conduct a pre-processing as needed before processing the content to extract a search term based on the content. The pre-processing may be a process such as enhancing BBX as discussed above to encompass a line of text. Any processes content may be sent to the search term/ results engine 221 for further processing.

The context processing module 207 processes the context communicated to the context/content processing platform 103 by way of the communication module 203 relating to the UE 101 and/or the user including, but not limited to, the context as discussed above such as location, time, temperature, etc. that may be used to enhance the extraction of content for a search and/or to abstract the search to generate recommendations related to the content and/or the context. Any processed content may be sent to the search term/results engine 221 for further processing. The profile processing module 209 may access a user profile that is associated with the social networking service 107 and/or the UE 101 by way of the communication module 203. The profile processing module 209 may mine a user profile to determine user profile information such as, but not limited to, behavioral tendencies, interests, and/or preferences that may be used to enhance the extraction of content for a search and/or to abstract the search to generate recommendations related to the content, the context, and/or the user profile information.

The planar object engine 211, 1D barcode engine 213, text engine 215, 2D barcode engine 217 and unknown object detector 219 are all specialized for processing a respective type of content. So, if the content processing module 205 determines that a match for a particular content type exists with an appropriate engine, the processed content is sent to the appropriate engine for further processing. As discussed above, the determination and matching of a content type may be based on a confidence and progress value in various embodiments. If the content type is unknown, the unknown object type detector may cause an alert that the object type is unknown, such as by causing the process to time-out, or it may, depending on the severity of the unknown content type, cause that unknown portion of the content to be excluded from any further processing so at least some search may be conducted for at least the recognizable content types.

Any of the processed content, context and/or user profile information generated by any of the modules or engines is then processed by the search term/results engine 221. The search term/results engine 221 processes the incoming content, context and/or user profile information to generate search terms for entry into a web browser, whether that entry is automatic or optionally input by a user after the search term is generated. The search terms and/or results may be directly related to the content, or tangentially related based on estimated interests that are developed based on the context and/or user profile information. The search term/results engine 221 also causes results to be provided for any search relating to the generated search terms which, as discussed above, may appear to occur seamlessly without user interaction beyond causing an input of content by way of sensor(s) 111 to a user of the UE 101 and the search API 109.

Figure 3:
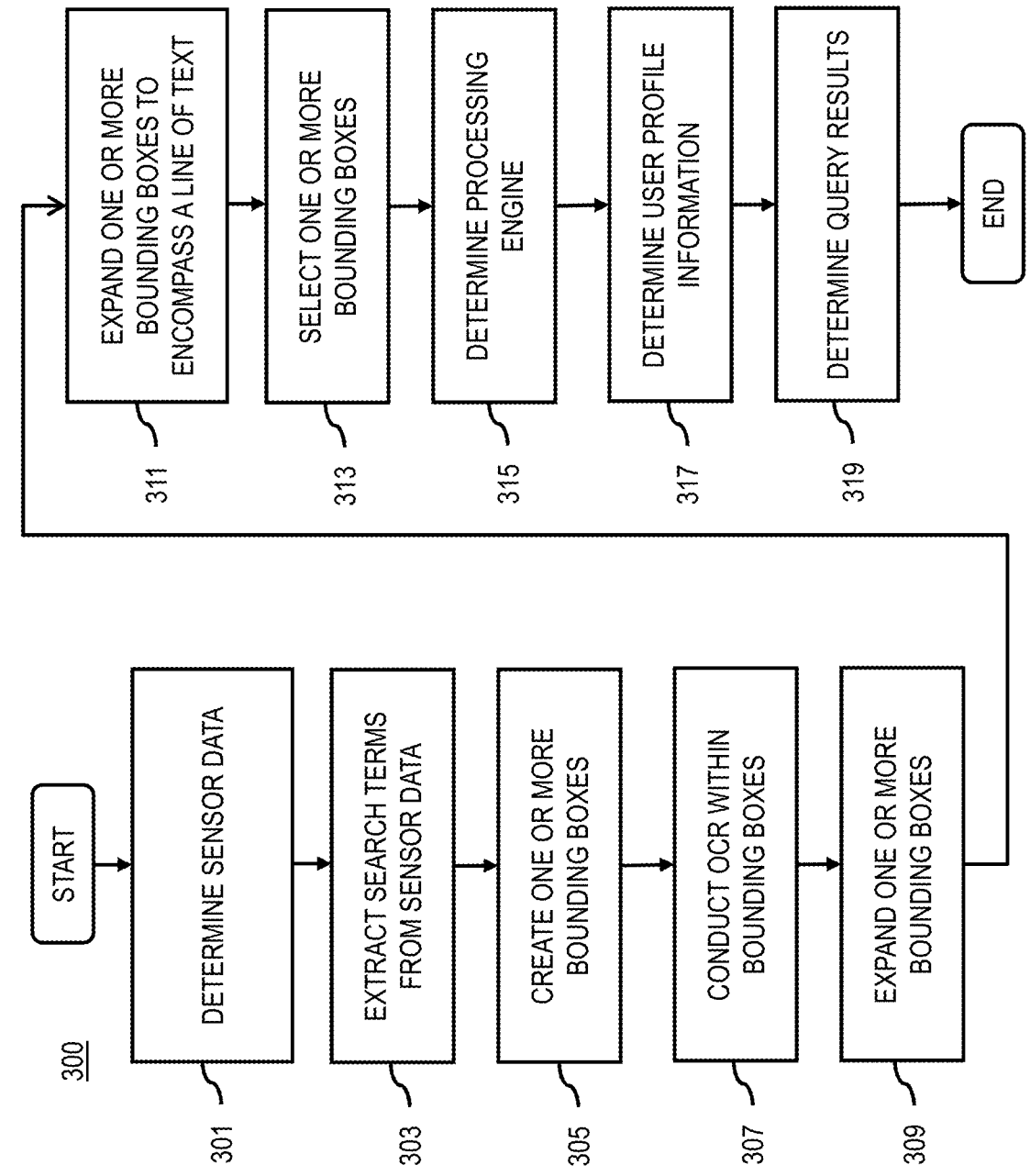
FIG. 3 is a flowchart of a process for conducting a search based on an extraction of a search term from available sensor data, according to one embodiment.
Figure 6:
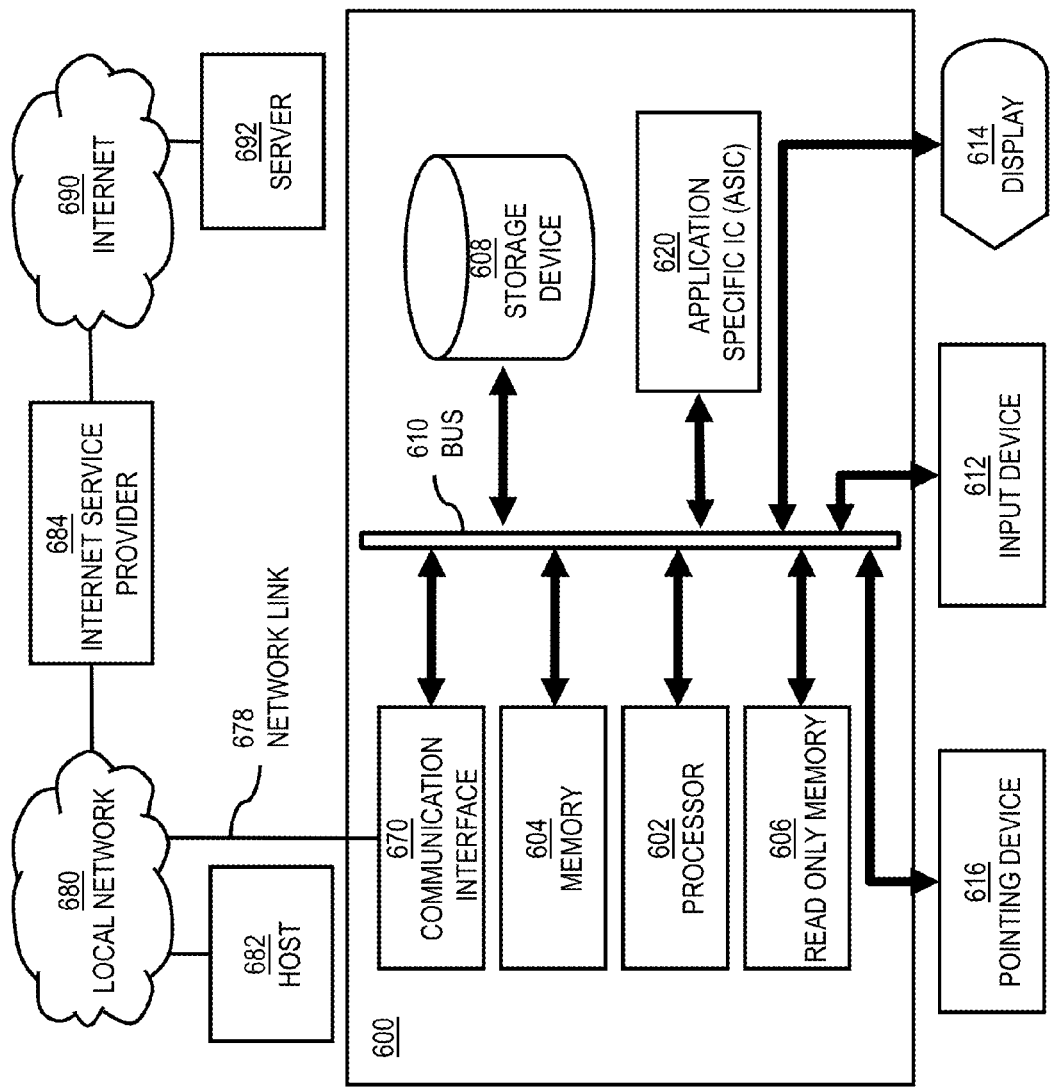
FIG. 6 is a diagram of hardware that can be used to implement an embodiment of the invention.

FIG. 3 is a flowchart of a process for conducting a search based on a search term extracted from available sensor data, according to one embodiment. In one embodiment, the context/content processing platform 103 performs the process 300 and is implemented in, for instance, a chip set including a processor and a memory as shown in FIG. 6. In step 301, the context/content processing platform 103 determines sensor data associated with at least one UE 101. The sensor data is determined from among a plurality of available data modes such as, but not limited to, optical, audio, and/or textual. The sensor data may be detected by way of sensors 111 discussed above. The sensors 111 may be, for example, a camera, microphone, thermometer, barometer, GPS, etc. The sensors 111, if optical for example, may be associated with an augmented reality display that is associated with the UE 101 and/or the search API 109. The augmented reality display, for example, may be used by pointing the UE 101 at an object and the process 300 is conducted in real-time to produce search results based on what is shown by the augmented reality display.

The process continues to step 303 in which the context/ content processing platform 103 processes and/or facilitates a processing of the sensor data to cause, at least in part, an extraction of one or more search terms for at least one query. For example, the sensor data may be of a picture that includes text, the text may be processed to be used in a search, or the sensor data may be an image of a building, that image may be processed to determine the name of the building for entry in a search. Alternatively, or in addition to an optical input, an audio input may be processed and converted to text to extract a search term from the sensor data. Further, a textual input may be used directly, or modified in consideration of other sensor data and/or available context and user profile data to extract a search term that could be abstracted from the textual input to enhance the search, suggest an intended search, etc.

The process continues to step 305 in which the context/content processing platform 103 causes, at least in part, a creation of one or more bounding boxes around one or more estimated text portions of the sensor data. The bounding boxes, as discussed above, may be of any shape around an estimated text region. Then, in step 307, the context/content processing platform 103 causes, at least in part, an optical character recognition of the sensor data within the one or more bounding boxes. For example, if the sensor data is an image that includes a series of text regions such as a name and telephone number on a business card, bounding boxes are created around each of the estimated text regions which may be, for example, three separate boxes for a phone number 777-777-7777. Because conducting OCR on each individual box is essentially useless, aside from perhaps conducting a search for an area code, the process continues to step 309 in which the context/content processing platform 103 processes and/or facilitates a processing of the one or more bounding boxes to cause, at least in part, an expansion of the one or more bounding boxes. The expansion may be in any direction that may suit the image. But, if the image is one that the context/content processing platform 103 determines includes what could be interpreted as lines of text, the process continues to step 311 in which the context/content processing platform 103 causes, at least in part, the expansion of the one or more bounding boxes to encompass a line of text. For example, the context/content processing platform 103 detects text lines for each bounding box and assigns text line number ID to each of the BBX. The context/content processing platform 103 groups the BBX according to text lines in an array and geometrically merges and joins each of the BBX by text line number ID. The context/content processing platform 103 then re-ranks the grouped BBX from a top of the image to a bottom and outputs a new four coordinate systems and a new number of BBX.

Next, in step 313, in a case where there are multiple bounding boxes remaining within an image, one for each line of text, for example, the context/content processing platform 103 determines one or more selected bounding boxes upon which the extraction is based. The process continues to step 315 in which the context/content processing platform 103 determines information comprising one or more preferences and/or behavioral tendencies of the user by way of mining the user profile associated with the social networking service 107 and/or the UE 101 to cause, at least in part, the one or more results of the at least one query to be modified based on the information.

Then, in step 317, the context/content processing platform 103 determines a processing engine of one or more available processing engines for processing the sensor data based, at least in part, on a confidence value that the sensor data is of at least one data mode type that corresponds to a respective processing engine of the one or more available processing engines. For example, the context/content processing platform 103 using the content processing module 205 determines a content type and associates the content type with a processing engine that is specialized for handling a particular content type. The processing engines, however, may have the ability to process multiple content types for a more efficient usage of resources than an individual engine for every known content type.

The process continues to step 319 in which the context/content processing platform 103 determines one or more results of the at least one query based, at least in part, on context information associated with the at least one device, user profile information associated with the at least one device, or a combination thereof. The context/content processing platform 103 may also translate one or more results of the at least one query of the sensor data based, at least in part, on the user profile information associated with the at least one device.

Figure 4A:
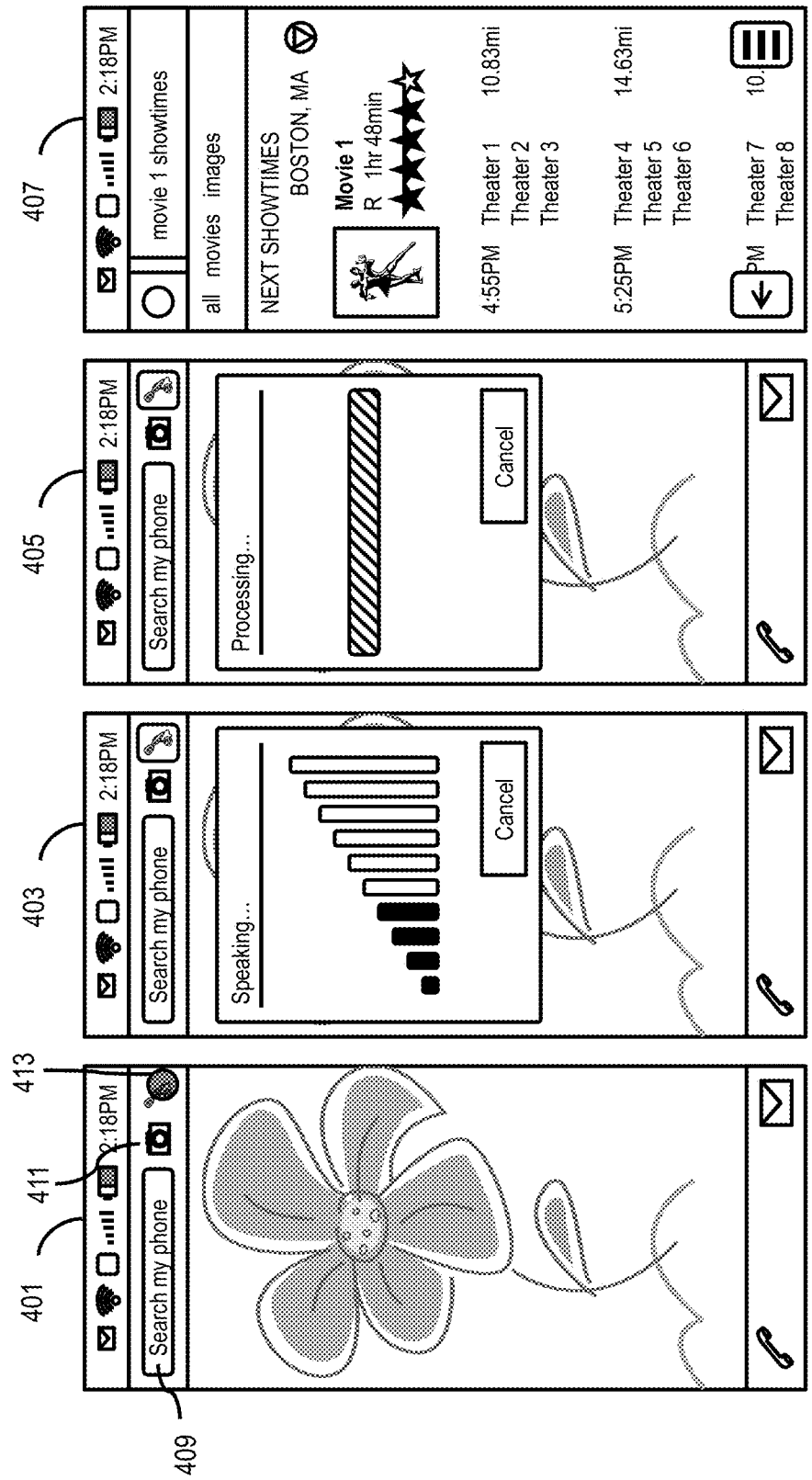
FIG. 4A illustrates user interfaces utilized in the processes of FIG. 3, according to one embodiment.

FIG. 4A illustrates a series of user interface diagrams 401-407 utilized in the processes of FIG. 3, according to various embodiments. User interface 401 illustrates a search API 409. The search API 409 has a field for text entry, as well as optional image and audio input buttons 411 and 413. The audio input 413 is illustrated as being selected. User interface 403 illustrates a that the audio input is occurring. The audio input may be a user speaking so that it can be converted to text, or other audio input such as a song that may be search, or other sound. User interface 405 illustrates that the context/content processing platform 103 is processing the sensed data in congruence with any detected context and/or user profile information. User interface 407 illustrates the results output by the search API 109. In this example, a user may have spoken something relating to the movie "Black Swan." The search system 100 converted the audio input to a searchable term "Black Swan," considered context information relating to the time of the request and/or the sensed location and/or considered behavioral tendencies based on information mined from an associated user profile to suggest movie times and locations for the movie that might be of interest to the user.

FIG. 4B illustrates a series of user interface diagrams 401 and 419 utilized in the processes of FIG. 3, according to various embodiments. User interface 401 illustrates a search API 409. The search API 409 has a field for text entry, as well as optional image and audio input buttons 411 and 413. The image input 411 is illustrated as being selected. User interface 401 illustrates a captured image 417 that illustrates a business card, for example, that is captured using a capture button 415. The context/content processing platform 103 conducts the above described bounding box preprocessing step and outputs an image of a business card 421 that has bounding boxes that have been generated, processed and merged. From the user interface 419 that illustrates the output image, a user may select any of the bounding boxes in the image 421 for inputting into a search. The selection is illustrated by indicator 423 which may, for example, be associated with a user's touch or other means for selecting a bounding box for entering its contents into a search.

Figure 5A:
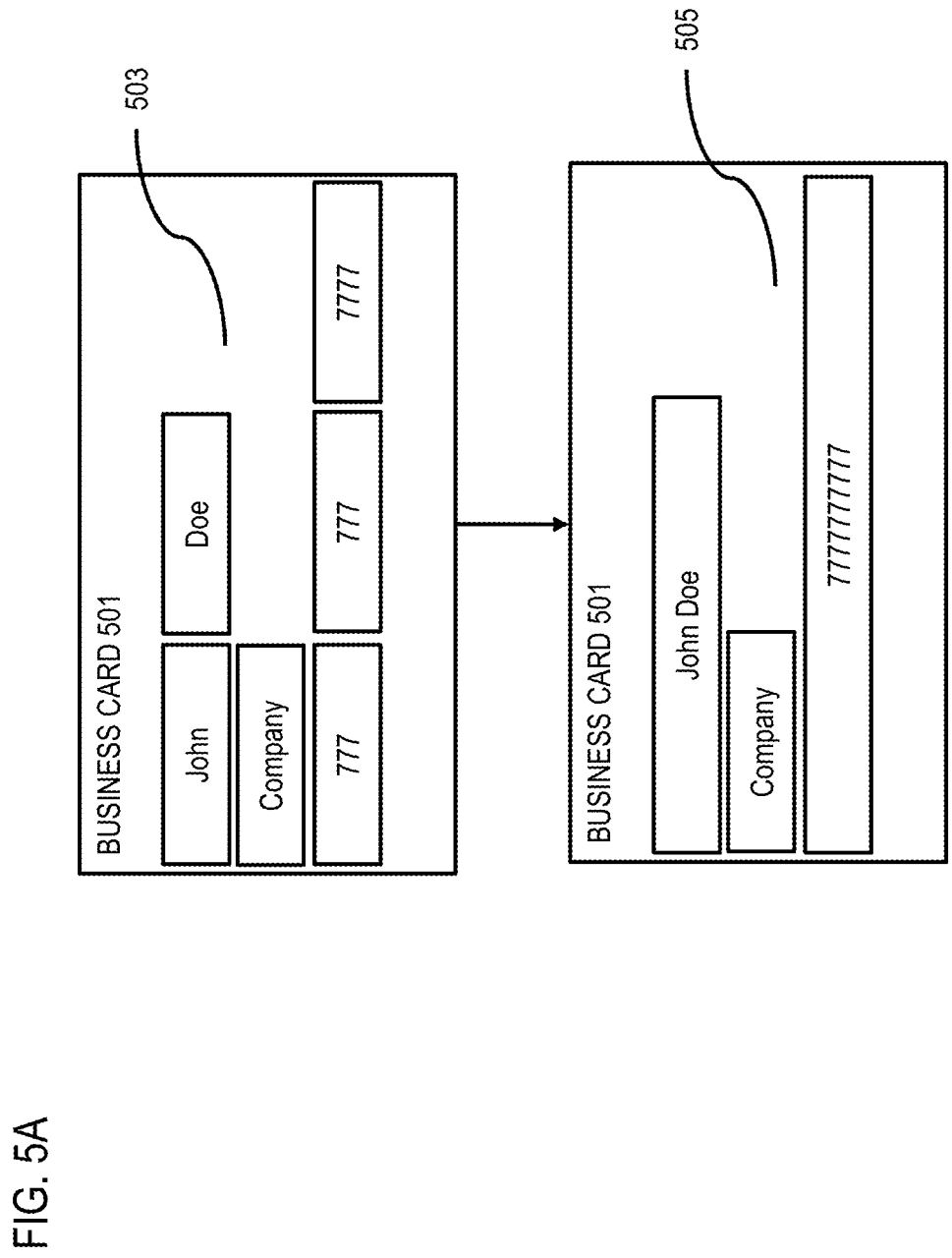
FIG. 5A illustrates an example of a bounding box pre-processing expansion, according to one embodiment.

FIG. 5A illustrates an example of the bounding box preprocessing step in the context of an image of a business card 501. The pre-processing step may be used, however, on any type of image in which OCR is to be performed. An image is input as sensor data by way of the sensors 111 of the business card 501. The context/content processing platform 103 instructs the content processing module 205 to process the business card 501. The content processing module 205 creates bounding boxes 503 around estimated text regions and conducts an OCR of the regions within the bounding boxes 503. The content processing module 205 then processes the bounding boxes 503 and estimates what regions are an entire line of text. The content processing module 205 then expands the bounding boxes 503 to encompass a line of text to form bounding boxes 505. As discussed above, the expansion of the bounding boxes may be in any direction and is not limited to the linear direction as illustrated in FIG. 5A. For example, if the text of the business card 501 were slanted, curved, circular, etc, the expansion could be done in any direct to accommodate any format or font style of text. The bounding boxes 505 fully encompass the line of text so that a search for John Doe, Company and/or 777-777-7777 individually, or as a whole, will likely yield more pointed results than a search based on the individual bounding boxes 503. The search accordingly is extracted from any selected bounding boxes 505.

Figure 5B:
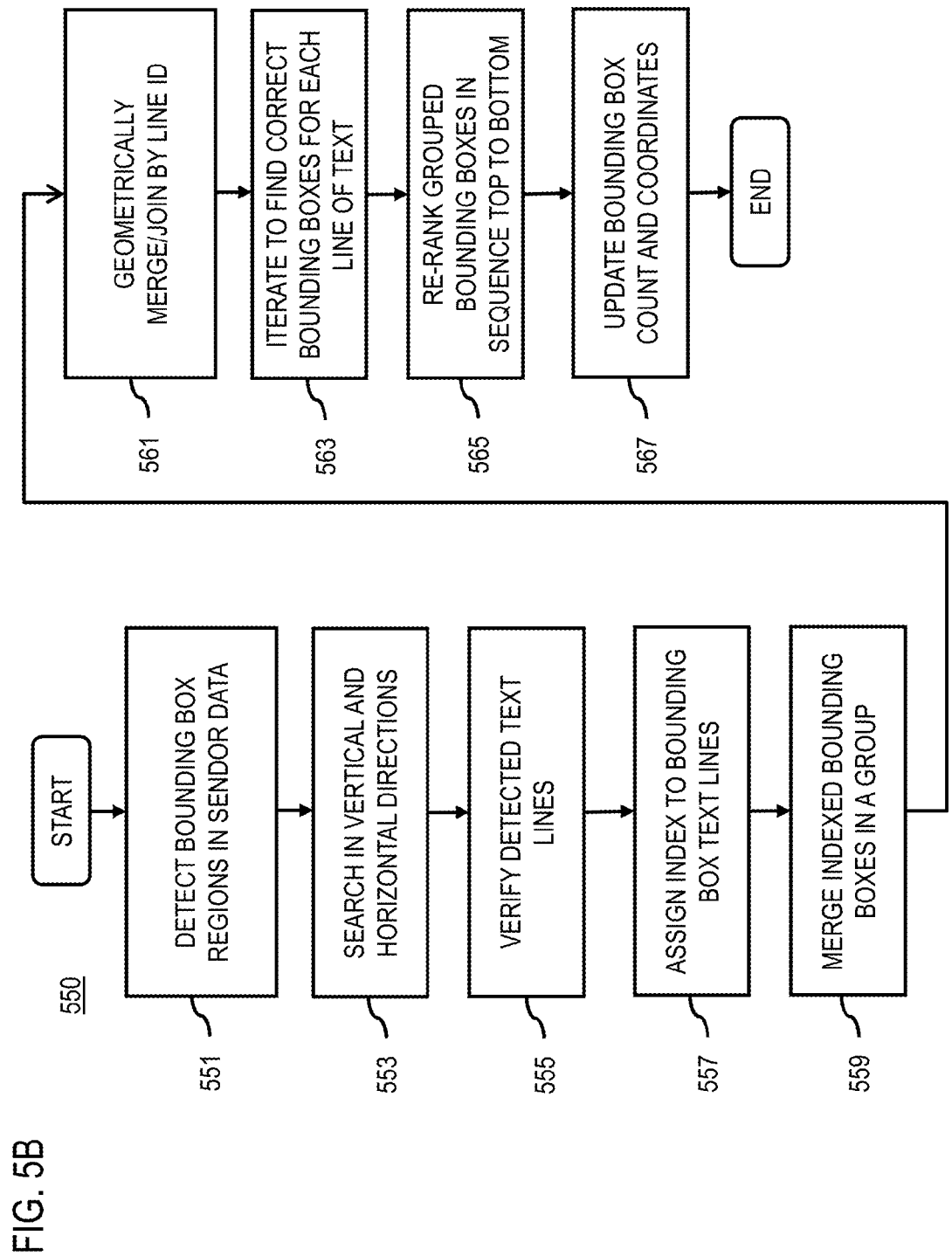
FIG. 5B illustrates a flowchart of a bounding box pre-processing expansion, according to one embodiment.

FIG. 5B illustrates a flowchart of a process 550 for the bounding box preprocessing step illustrated in FIG. 5A, according to one embodiment. The process 550 begins at step 551 in which bounding box regions are detected around sensor data, such as an image taken of a business card 501 discussed above. The process continues to step 553 in which the context/content processing platform 103 searches the image vertical and horizontal directions to detect objects within the bounding box regions and possible text lines. Then, in step 555, the context/content processing platform 103 verifies the detected text lines within the bounding boxes and assigns an index number designated a line ID for the detected bounding box text lines in step 557.

The process continues to step 559 in which the context/content processing platform 103 merges the indexed bounding boxes in a group and geometrically merges/joins the bounding boxes by indexed line ID in step 561. Then, in step 563, the context/content processing platform 103 iterates any of steps 551-561 to find the correct bounding boxes for each line of text. Next, in step 565, the context/content processing platform 103 re-ranks the grouped bounding boxes in sequence from a top of the sensor data to a bottom of the sensor data (i.e. the top to the bottom of the sensed image). Then, in step 567, the context/content processing platform updates the bounding box count and coordinates.

The processes described herein for conducting a search based on an extraction of a search term from available sensor data may be advantageously implemented via software, hardware, firmware or a combination of software and/or firmware and/or hardware. For example, the processes described herein, may be advantageously implemented via processor (s), Digital Signal Processing (DSP) chip, an Application Specific Integrated Circuit (ASIC), Field Programmable Gate Arrays (FPGAs), etc. Such exemplary hardware for performing the described functions is detailed below.

FIG. 6 illustrates a computer system 600 upon which an embodiment of the invention may be implemented. Although computer system 600 is depicted with respect to a particular device or equipment, it is contemplated that other devices or equipment (e.g., network elements, servers, etc.) within FIG. 6 can deploy the illustrated hardware and components of system 600. Computer system 600 is programmed (e.g., via computer program code or instructions) to conduct a search based on an extraction of a search term from available sensor data as described herein and includes a communication mechanism such as a bus 610 for passing information between other internal and external components of the computer system 600. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 600, or a portion thereof, constitutes a means for performing one or more steps of conducting a search based on an extraction of a search term from available sensor data.

A bus 610 includes one or more parallel conductors of information so that information is transferred quickly among devices coupled to the bus 610. One or more processors 602 for processing information are coupled with the bus 610.

A processor (or multiple processors) 602 performs a set of operations on information as specified by computer program code related to conduct a search based on an extraction of a search term from available sensor data. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 610 and placing information on the bus 610. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 602, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 600 also includes a memory 604 coupled to bus 610. The memory 604, such as a random access memory (RAM) or any other dynamic storage device, stores information including processor instructions for conducting a search based on an extraction of a search term from available sensor data. Dynamic memory allows information stored therein to be changed by the computer system 600. RAM allows a unit of information stored at a location called a memory address to be stored and retrieved independently of information at neighboring addresses. The memory 604 is also used by the processor 602 to store temporary values during execution of processor instructions. The computer system 600 also includes a read only memory (ROM) 606 or any other static storage device coupled to the bus 610 for storing static information, including instructions, that is not changed by the computer system 600. Some memory is composed of volatile storage that loses the information stored thereon when power is lost. Also coupled to bus 610 is a non-volatile (persistent) storage device 608, such as a magnetic disk, optical disk or flash card, for storing information, including instructions, that persists even when the computer system 600 is turned off or otherwise loses power.

Information, including instructions for conducting a search based on an extraction of a search term from available sensor data, is provided to the bus 610 for use by the processor from an external input device 612, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 600. Other external devices coupled to bus 610, used primarily for interacting with humans, include a display device 614, such as a cathode ray tube (CRT), a liquid crystal display (LCD), a light emitting diode (LED) display, an organic LED (OLED) display, a plasma screen, or a printer for presenting text or images, and a pointing device 616, such as a mouse, a trackball, cursor direction keys, or a motion sensor, for controlling a position of a small cursor image presented on the display 614 and issuing commands associated with graphical elements presented on the display 614. In some embodiments, for example, in embodiments in which the computer system 600 performs all functions automatically without human input, one or more of external input device 612, display device 614 and pointing device 616 is omitted.

In the illustrated embodiment, special purpose hardware, such as an application specific integrated circuit (ASIC) 620, is coupled to bus 610. The special purpose hardware is configured to perform operations not performed by processor 602 quickly enough for special purposes. Examples of ASICs include graphics accelerator cards for generating images for display 614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 600 also includes one or more instances of a communications interface 670 coupled to bus 610. Communication interface 670 provides a one-way or two-way communication coupling to a variety of external devices that operate with their own processors, such as printers, scanners and external disks. In general the coupling is with a network link 678 that is connected to a local network 680 to which a variety of external devices with their own processors are connected. For example, communication interface 670 may be a parallel port or a serial port or a universal serial bus (USB) port on a personal computer. In some embodiments, communications interface 670 is an integrated services digital network (ISDN) card or a digital subscriber line (DSL) card or a telephone modem that provides an information communication connection to a corresponding type of telephone line. In some embodiments, a communication interface 670 is a cable modem that converts signals on bus 610 into signals for a communication connection over a coaxial cable or into optical signals for a communication connection over a fiber optic cable. As another example, communications interface 670 may be a local area network (LAN) card to provide a data communication connection to a compatible LAN, such as Ethernet. Wireless links may also be implemented. For wireless links, the communications interface 670 sends or receives or both sends and receives electrical, acoustic or electromagnetic signals, including infrared and optical signals, that carry information streams, such as digital data. For example, in wireless handheld devices, such as mobile telephones like cell phones, the communications interface 670 includes a radio band electromagnetic transmitter and receiver called a radio transceiver. In certain embodiments, the communications interface 670 enables connection to the communication network 105 for conducting a search based on an extraction of a search term from available sensor data to the UE 101.

The term "computer-readable medium" as used herein refers to any medium that participates in providing information to processor 602, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 608. Volatile media include, for example, dynamic memory 604. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 620.

Network link 678 typically provides information communication using transmission media through one or more networks to other devices that use or process the information. For example, network link 678 may provide a connection through local network 680 to a host computer 682 or to equipment 684 operated by an Internet Service Provider (ISP). ISP equipment 684 in turn provides data communication services through the public, world-wide packet-switching communication network of networks now commonly referred to as the Internet 690.

A computer called a server host 692 connected to the Internet hosts a process that provides a service in response to information received over the Internet. For example, server host 692 hosts a process that provides information representing video data for presentation at display 614. It is contemplated that the components of system 600 can be deployed in various configurations within other computer systems, e.g., host 682 and server 692.

At least some embodiments of the invention are related to the use of computer system 600 for implementing some or all of the techniques described herein. According to one embodiment of the invention, those techniques are performed by computer system 600 in response to processor 602 executing one or more sequences of one or more processor instructions contained in memory 604. Such instructions, also called computer instructions, software and program code, may be read into memory 604 from another computer-readable medium such as storage device 608 or network link 678. Execution of the sequences of instructions contained in memory 604 causes processor 602 to perform one or more of the method steps described herein. In alternative embodiments, hardware, such as ASIC 620, may be used in place of or in combination with software to implement the invention. Thus, embodiments of the invention are not limited to any specific combination of hardware and software, unless otherwise explicitly stated herein.

The signals transmitted over network link 678 and other networks through communications interface 670, carry information to and from computer system 600. Computer system 600 can send and receive information, including program code, through the networks 680, 690 among others, through network link 678 and communications interface 670. In an example using the Internet 690, a server host 692 transmits program code for a particular application, requested by a message sent from computer 600, through Internet 690, ISP equipment 684, local network 680 and communications interface 670. The received code may be executed by processor 602 as it is received, or may be stored in memory 604 or in storage device 608 or any other non-volatile storage for later execution, or both. In this manner, computer system 600 may obtain application program code in the form of signals on a carrier wave.

Various forms of computer readable media may be involved in carrying one or more sequence of instructions or data or both to processor 602 for execution. For example, instructions and data may initially be carried on a magnetic disk of a remote computer such as host 682. The remote computer loads the instructions and data into its dynamic memory and sends the instructions and data over a telephone line using a modem. A modem local to the computer system 600 receives the instructions and data on a telephone line and uses an infra-red transmitter to convert the instructions and data to a signal on an infra-red carrier wave serving as the network link 678. An infrared detector serving as communications interface 670 receives the instructions and data carried in the infrared signal and places information representing the instructions and data onto bus 610. Bus 610 carries the information to memory 604 from which processor 602 retrieves and executes the instructions using some of the data sent with the instructions. The instructions and data received in memory 604 may optionally be stored on storage device 608, either before or after execution by the processor 602.

Figure 7:
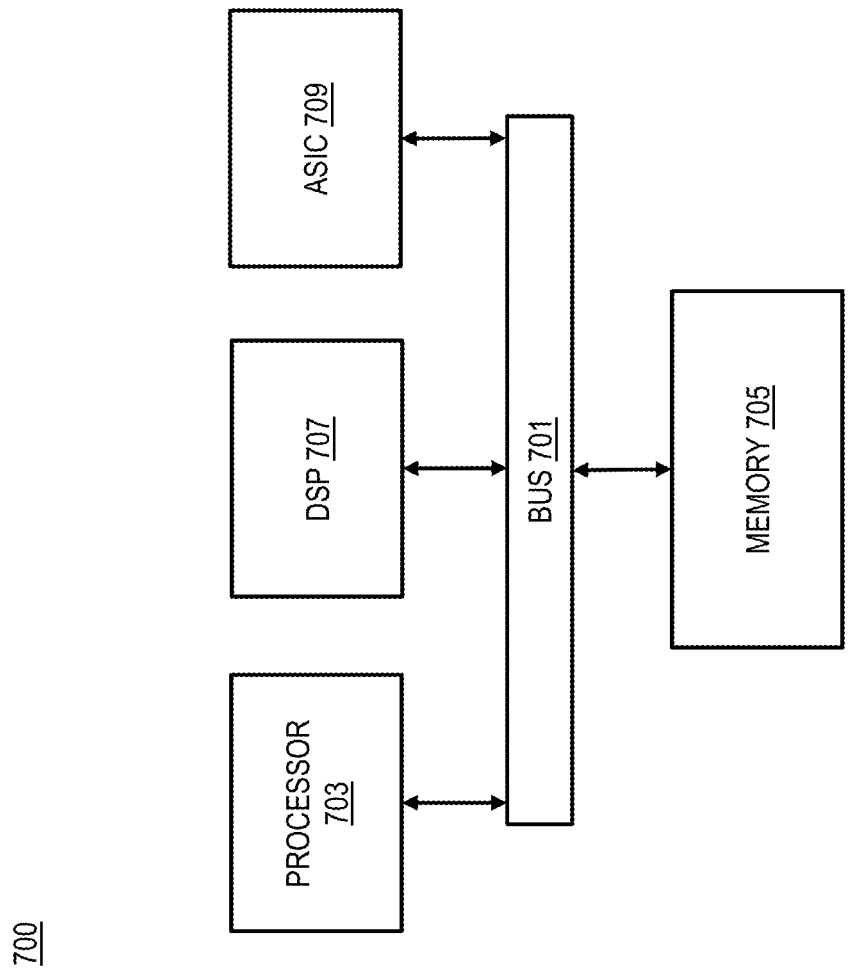
FIG. 7 is a diagram of a chip set that can be used to implement an embodiment of the invention.

FIG. 7 illustrates a chip set or chip 700 upon which an embodiment of the invention may be implemented. Chip set 700 is programmed to conduct a search based on an extraction of a search term from available sensor data as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 700 can be implemented in a single chip. It is further contemplated that in certain embodiments the chip set or chip 700 can be implemented as a single "system on a chip." It is further contemplated that in certain embodiments a separate ASIC would not be used, for example, and that all relevant functions as disclosed herein would be performed by a processor or processors. Chip set or chip 700, or a portion thereof, constitutes a means for performing one or more steps of providing user interface navigation information associated with the availability of functions. Chip set or chip 700, or a portion thereof, constitutes a means for performing one or more steps of conducting a search based on an extraction of a search term from available sensor data.

In one embodiment, the chip set or chip 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 700 includes merely one or more processors and some software and/or firmware supporting and/or relating to and/or for the one or more processors.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to conduct a search based on an extraction of a search term from available sensor data. The memory 705 also stores the data associated with or generated by the execution of the inventive steps.

Figure 8:
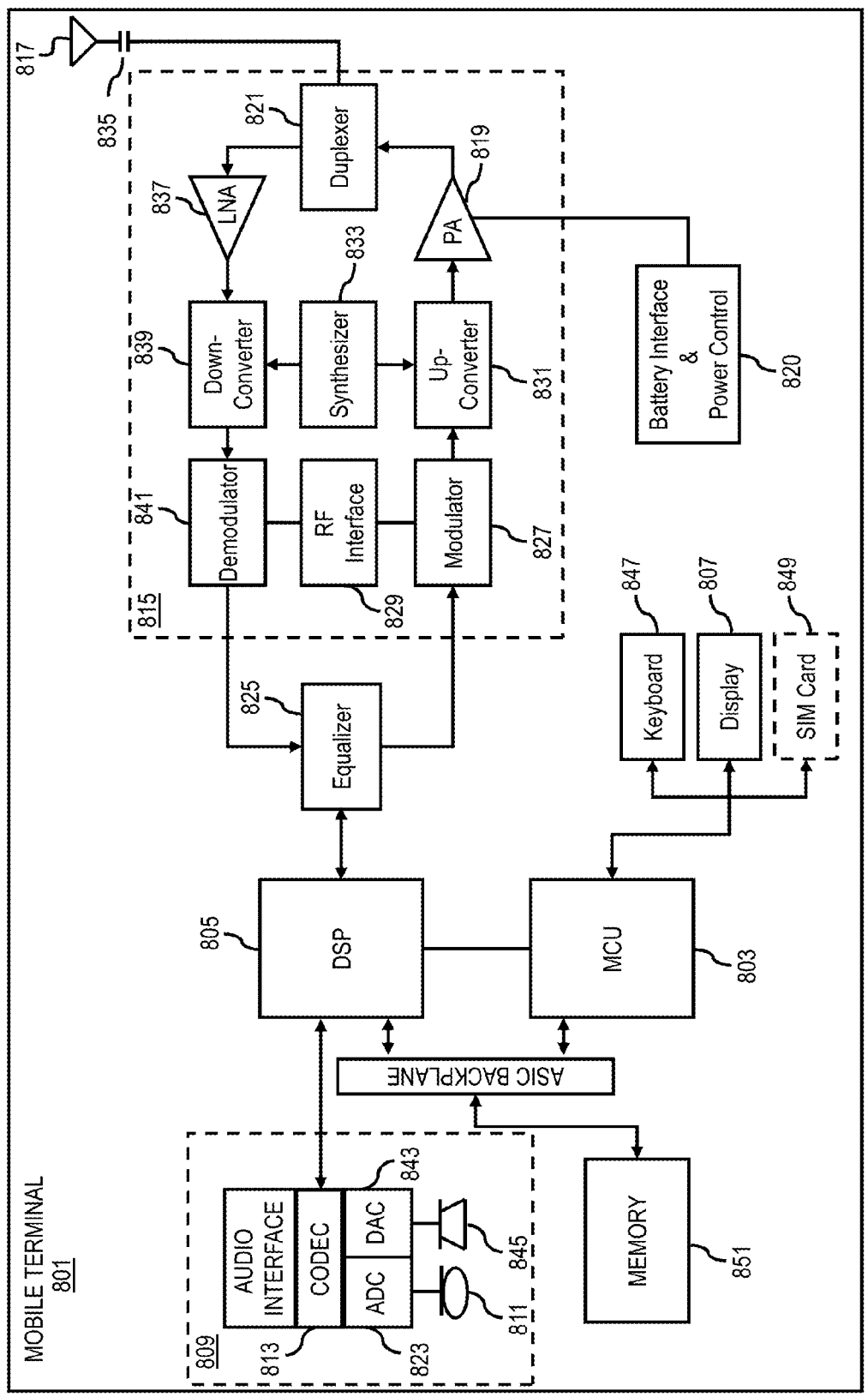
FIG. 8 is a diagram of a mobile terminal (e.g., handset) that can be used to implement an embodiment of the invention.

FIG. 8 is a diagram of exemplary components of a mobile terminal (e.g., handset) for communications, which is capable of operating in the system of FIG. 1, according to one embodiment. In some embodiments, mobile terminal 801, or a portion thereof, constitutes a means for performing one or more steps of conducting a search based on an extraction of a search term from available sensor data. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 803, a Digital Signal Processor (DSP) 805, and a receiver/transmitter unit including a microphone gain control unit and a speaker gain control unit. A main display unit 807 provides a display to the user in support of various applications and mobile terminal functions that perform or support the steps of conducting a search based on an extraction of a search term from available sensor data. The display 807 includes display circuitry configured to display at least a portion of a user interface of the mobile terminal (e.g., mobile telephone). Additionally, the display 807 and display circuitry are configured to facilitate user control of at least some functions of the mobile terminal. An audio function circuitry 809 includes a microphone 811 and microphone amplifier that amplifies the speech signal output from the microphone 811. The amplified speech signal output from the microphone 811 is fed to a coder/decoder (CODEC) 813.

A radio section 815 amplifies power and converts frequency in order to communicate with a base station, which is included in a mobile communication system, via antenna 817. The power amplifier (PA) 819 and the transmitter/modulation circuitry are operationally responsive to the MCU 803, with an output from the PA 819 coupled to the duplexer 821 or circulator or antenna switch, as known in the art. The PA 819 also couples to a battery interface and power control unit 820.

In use, a user of mobile terminal 801 speaks into the microphone 811 and his or her voice along with any detected background noise is converted into an analog voltage. The analog voltage is then converted into a digital signal through the Analog to Digital Converter (ADC) 823. The control unit 803 routes the digital signal into the DSP 805 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 825 for compensation of any frequency-dependent impairments that occur during transmission though the air such as phase and amplitude distortion. After equalizing the bit stream, the modulator 827 combines the signal with a RF signal generated in the RF interface 829. The modulator 827 generates a sine wave by way of frequency or phase modulation. In order to prepare the signal for transmission, an up-converter 831 combines the sine wave output from the modulator 827 with another sine wave generated by a synthesizer 833 to achieve the desired frequency of transmission. The signal is then sent through a PA 819 to increase the signal to an appropriate power level. In practical systems, the PA 819 acts as a variable gain amplifier whose gain is controlled by the DSP 805 from information received from a network base station. The signal is then filtered within the duplexer 821 and optionally sent to an antenna coupler 835 to match impedances to provide maximum power transfer. Finally, the signal is transmitted via antenna 817 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 801 are received via antenna 817 and immediately amplified by a low noise amplifier (LNA) 837. A down-converter 839 lowers the carrier frequency while the demodulator 841 strips away the RF leaving only a digital bit stream. The signal then goes through the equalizer 825 and is processed by the DSP 805. A Digital to Analog Converter (DAC) 843 converts the signal and the resulting output is transmitted to the user through the speaker 845, all under control of a Main Control Unit (MCU) 803 which can be implemented as a Central Processing Unit (CPU).

The MCU 803 receives various signals including input signals from the keyboard 847. The keyboard 847 and/or the MCU 803 in combination with other user input components (e.g., the microphone 811) comprise a user interface circuitry for managing user input. The MCU 803 runs a user interface software to facilitate user control of at least some functions of the mobile terminal 801 to conduct a search based on an extraction of a search term from available sensor data. The MCU 803 also delivers a display command and a switch command to the display 807 and to the speech output switching controller, respectively. Further, the MCU 803 exchanges information with the DSP 805 and can access an optionally incorporated SIM card 849 and a memory 851. In addition, the MCU 803 executes various control functions required of the terminal. The DSP 805 may, depending upon the implementation, perform any of a variety of conventional digital processing functions on the voice signals. Additionally, DSP 805 determines the background noise level of the local environment from the signals detected by microphone 811 and sets the gain of microphone 811 to a level selected to compensate for the natural tendency of the user of the mobile terminal 801.

The CODEC 813 includes the ADC 823 and DAC 843. The memory 851 stores various data including call incoming tone data and is capable of storing other data including music data received via, e.g., the global Internet. The software module could reside in RAM memory, flash memory, registers, or any other form of writable storage medium known in the art. The memory device 851 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 849 carries, for instance, important information, such as the cellular phone number, the carrier supplying service, subscription details, and security information. The SIM card 849 serves primarily to identify the mobile terminal 801 on a radio network. The card 849 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising facilitating a processing of and/or processing (1) data and/or (2) information and/or (3) at least one signal, the (1) data and/or (2) information and/or (3) at least one signal by a processor based, at least in part, on the following:

a creation of one or more bounding boxes around one or more estimated text portions of sensor data associated with at least one device;

an optical character recognition of the one or more estimated text portions within each of the one or more bounding boxes to determine recognized characters;

a merger of some of the one or more bounding boxes into at least one merged box along a bounding box line of some of the estimated text portions based, at least in part, on the recognized characters within the each bounding box;
an extraction, from some of the recognized characters that are within the remaining one or more bounding boxes that are not merged, of one or more search terms for at least one query based, at least in part, on the recognized characters within the at least one merged box; and
a search based, at least in part, on the at least one query and the one or more search terms to generate one or more results of the at least one query,
wherein the one or more bounding boxes are assigned an identification number and ranked in order from a top of an image to a bottom of the image sensed by way of an optical sensor.

2. The method of claim 1, wherein the sensor data is an audio input, and the audio input is converted to textual information.

3. The method of claim 1, wherein the (1) data and/or (2) information and/or (3) at least one signal are further based, at least in part, on the following:
at least one determination of a processing engine of one or more available processing engines for processing the sensor data based, at least in part, on a confidence value that the sensor data is of at least one data mode type that corresponds to a respective processing engine of the one or more available processing engines.

4. The method of claim 3, wherein the processing engines concurrently process one or more barcodes, one or more 2D planar objects, one or more 3D objects, or a combination thereof, to provide one or more of the textual strings.

5. The method of claim 3, wherein at least one of the processing engines processes pattern recognition for indexing from one or more photo search systems, to provide one or more of the textual strings.

6. The apparatus of claim 1, wherein the one or more results of the at least one query are a translation of the sensor data based, at least in part, on the user profile information associated with the at least one device.

7. The apparatus of claim 1, wherein the apparatus is further caused to:
determine information comprising one or more preferences and/or behavioral tendencies of the user by way of mining the user profile to cause, at least in part, the one or more results of the at least one query to be modified based on the information.

8. The method of claim 1, wherein the one or more results of the at least one query is further determined based, at least in part, on context information associated with the at least one device, user profile information associated with the at least one device, or a combination thereof.

9. The method of claim 8, wherein the context information associated with the at least one device includes user-to-device interaction data, historical data pertaining to the at least one device, or a combination thereof.

10. The method of claim 8, wherein the one or more results of the at least one query are a translation of the sensor data based, at least in part, on the user profile information associated with the at least one device.

11. The method of claim 8, wherein the (1) data and/or (2) information and/or (3) at least one signal are further based, at least in part, on the following:
information comprising one or more preferences and/or behavioral tendencies of the user by way of mining the user profile to cause, at least in part, the one or more results of the at least one query to be modified based on the information.

12. A method comprising facilitating a processing of and/or processing (1) data and/or (2) information and/or (3) at least one signal, the (1) data and/or (2) information and/or (3) at least one signal by a processor based, at least in part, on the following:
a creation of one or more bounding boxes around one or more estimated text portions of sensor data with at least one device;
a merger of some of the one or more bounding boxes into at least one merged box along a bounding box array, prior to optical character recognition;
an optical character recognition of the some estimated text portions within the at least one merged box and of the remaining one or more estimated text portions within the remaining one or more bounding boxes that are not merged;
an extraction of one or more search terms for at least one query based, at least in part, on optical character recognition results associated with the at least one merged box;
an extraction of one or more additional search terms for the at least one query based, at least in part, on optical character recognition results associated with the remaining one or more bounding boxes that are not merged; and
a search based, at least in part, on the at least one query and the one or more additional search terms to generate one or more results of the at least one query.

13. The method of claim 12, wherein the optical sensor is associated with an augmented reality display.

14. The method of claim 13, wherein the sensor data is detected and processed in real time with respect to a representation shown by the augmented reality display.

15. An apparatus comprising:
at least one processor; and
at least one memory including computer program code for one or more programs,
the at least one memory and the computer program code configured to, with the at least one processor, cause the apparatus to perform at least the following,
cause, at least in part, a creation of one or more bounding boxes around one or more estimated text portions of sensor data associated with at least one device;
cause, at least in part, an optical character recognition of the one or more estimated text portions within each of the one or more bounding boxes to determine recognized characters;
cause, at least in part, a merger of some of the one or more bounding boxes into at least one merged box along a bounding box line of some of the estimated text portions based, at least in part, on the recognized characters within the each bounding box;
cause, at least in part, an extraction, from some of the recognized characters that are within the remaining one or more bounding boxes that are not merged, of one or more search terms for at least one query based, at least in part, on the recognized characters within the at least one merged box; and
a search based, at least in part, on the at least one query and the one or more search terms to generate one or more results of the at least one query,
wherein the one or more bounding boxes are assigned an identification number and ranked in order from a top of an image to a bottom of the image sensed by way of an optical sensor.

16. The apparatus of claim 15, wherein the optical sensor is associated with an augmented reality display.

17. The apparatus of claim 16, wherein the sensor data is detected and processed in real time with respect to a representation shown by the augmented reality display.

18. The apparatus of claim 15, wherein the apparatus is further caused to:
determine a processing engine of one or more available processing engines for processing the sensor data based, at least in part, on a confidence value that the sensor data is of at least one data mode type that corresponds to a respective processing engine of the one or more available processing engines.

19. An apparatus comprising:
at least one processor; and
at least one memory including computer program code for one or more programs,
the at least one memory and the computer program code configured to, with the at least one processor, cause the apparatus to perform at least the following,
cause, at least in part, a creation of one or more bounding boxes around one or more estimated text portions of sensor data with at least one device;
cause, at least in part, a merger of some of the one or more bounding boxes into at least one merged box along a bounding box array, prior to optical character recognition;
cause, at least in part, an optical character recognition of the some estimated text portions within the at least one merged box and of the remaining one or more estimated text portions within the remaining one or more bounding boxes that are not merged;
cause, at least in part, an extraction of one or more search terms for at least one query based, at least in part, on optical character recognition results associated with the at least one merged box;
cause, at least in part, an extraction of one or more additional search terms for the at least one query based, at least in part, on optical character recognition results associated with the remaining one or more bounding boxes that are not merged; and
cause, at least in part, a search based, at least in part, on the at least one query and the one or more additional search terms to generate one or more results of the at least one query.

\* \* \* \* \*